United States Patent
Freund et al.

(10) Patent No.: US 8,429,451 B2
(45) Date of Patent: Apr. 23, 2013

(54) METHOD OF HANDLING A MESSAGE

(75) Inventors: Thomas J. Freund, Austin, TX (US); Ian Robinson, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 12/578,804

(22) Filed: Oct. 14, 2009

(65) Prior Publication Data
US 2010/0095165 A1  Apr. 15, 2010

(30) Foreign Application Priority Data
Oct. 14, 2008 (EP) .................................... 08166551

(51) Int. Cl.
*G06F 11/00* (2006.01)

(52) U.S. Cl.
USPC .................................. 714/15; 714/20; 714/48

(58) Field of Classification Search .................... 714/15, 714/48, 20
See application file for complete search history.

(56) References Cited

U.S. PATENT DOCUMENTS

| | | | | | |
|---|---|---|---|---|---|
| 5,844,980 | A | * | 12/1998 | Patel et al. | 379/88.22 |
| 5,906,658 | A | * | 5/1999 | Raz | 710/39 |
| 5,916,307 | A | * | 6/1999 | Piskiel et al. | 719/314 |
| 6,012,094 | A | * | 1/2000 | Leymann et al. | 709/230 |
| 6,363,401 | B2 | * | 3/2002 | Yahya et al. | 1/1 |
| 6,490,595 | B1 | * | 12/2002 | Candee et al. | 1/1 |
| 6,578,159 | B1 | * | 6/2003 | Kitagawa et al. | 714/15 |
| 7,274,706 | B1 | * | 9/2007 | Nguyen et al. | 370/419 |
| 7,448,035 | B2 | * | 11/2008 | Dorrance et al. | 718/101 |
| 7,921,330 | B2 | * | 4/2011 | Riemers | 714/20 |
| 8,073,962 | B2 | * | 12/2011 | Parkinson et al. | 709/230 |
| 2002/0099862 | A1 | * | 7/2002 | Mikalsen et al. | 709/310 |
| 2002/0161815 | A1 | * | 10/2002 | Bischof et al. | 709/101 |
| 2004/0010518 | A1 | * | 1/2004 | Montemer | 707/104.1 |
| 2005/0050527 | A1 | * | 3/2005 | McCrady et al. | 717/141 |
| 2005/0096927 | A1 | * | 5/2005 | Mehta et al. | 705/1 |
| 2005/0222946 | A1 | * | 10/2005 | Mulholland et al. | 705/39 |
| 2006/0041690 | A1 | * | 2/2006 | Lee et al. | 710/5 |
| 2006/0171405 | A1 | * | 8/2006 | Brendle et al. | 370/412 |
| 2006/0294333 | A1 | * | 12/2006 | Michaylov et al. | 711/168 |

(Continued)

OTHER PUBLICATIONS

Notification of Transmittal of the International Search Report for PCT Application No. PCT/EP2009/063393; Mailing Date of Jan. 7, 2010; European Patent Office; Rijswijk, Switzerland.

(Continued)

*Primary Examiner* — Loan L. T. Truong
(74) *Attorney, Agent, or Firm* — Thomas E. Lees, LLC

(57) ABSTRACT

A method of handling a message in a messaging system is provided. The messaging system comprises a message source, a message receiver and a message service. The message service is intermediate of the message source and message receiver, wherein a compensation component is established at the message source. The method comprises the steps of, transmitting a one way message, as part of a business transaction, from the message source, the transaction comprising a plurality of one way messages, receiving the message at the message service, transmitting the message from the messaging service, receiving the message at the message receiver, processing the message at the message receiver, transmitting a communication from the message receiver, the communication indicating success or failure of the processing of the message, receiving the communication at the messaging service, and responsive to receiving an indication of a failure of part of the transaction when the communication indicated that processing of the one way message succeeded, causing compensation logic defined by the compensation component to execute.

8 Claims, 6 Drawing Sheets

U.S. PATENT DOCUMENTS

| | | | | |
|---|---|---|---|---|
| 2007/0038569 | A1* | 2/2007 | Hickson | 705/50 |
| 2007/0174185 | A1* | 7/2007 | McGoveran | 705/39 |
| 2008/0095246 | A1* | 4/2008 | Luo et al. | 375/240.27 |
| 2008/0307256 | A1* | 12/2008 | Chafle et al. | 714/15 |
| 2009/0064182 | A1* | 3/2009 | Holar et al. | 719/314 |
| 2009/0222822 | A1* | 9/2009 | Riemers | 718/101 |

OTHER PUBLICATIONS

Written Opinion of the International Searching Authority for PCT Application No. PCT/EP2009/063393; Mailing Date of Jan. 7, 2010; European Patent Office; Berlin, Germany.

Tai S. et al., "Dependency-Spheres: A Global Transaction Context for Distributed Objects and Messages", Enterprise Distributed Object Computing Conference, 2001. Proceedings. Fifth IEEE International, Sep. 4-7, 2001, Piscataway, NJ, USA, IEEE, pp. 105-115, XP010557274, ISBN: 978-0-7695-1345-4.

Tai S. et al., "Strategies for Integrating Messaging and Distributed Object Transactions", Middleware 2000, International Conference on Distributed Systems Platforms and Open Distributed Processing, Apr. 4-7, 2000, pp. 308-330, XP002561475, New York, ISBN: 3-540-67352-0.

Tai S. et al., "Message Queuing Patterns for Middleware-Mediated Transactions", Software Engineering and Middleware; [Lecture notes in Computer Science], Springer Berlin Heidelberg, Berlin, Heidelberg, vol. 2596, May 20, 2002, pp. 174-186, XP019073586, ISBN: 978-3-540-07549-3.

Tai S. et al., "Conditional Messaging: Extending Reliable Messaging with Application Conditions", Proceedings of the 22nd International Conference on Distributed Computing Systems. ICDCS 2002. Vienna, Austria, Jul. 2-5, 2002; [International Conference on Distributed Computing Systems], Los Alamitos, CA: IEEE Comp. Soc., US, vol. Conf. 22, Jul. 2, 2002, pp. 108-117, XP010595523, ISBN: 978-0-7695-1585-4.

* cited by examiner

METHOD OF HANDLING A MESSAGE

FIELD

Embodiments of this invention relates to handling a message in a message computer system, and more specifically, embodiments of the invention relate to providing an automated application execution guarantee for one-way messages using transactions.

BACKGROUND

In messaging systems, the use of messages and message queues in a wider network provide an asynchronous communications protocol, which means that the sender and receiver of a message do not need to interact with a message queue at the same time. Messages placed onto a queue are stored until a recipient retrieves them. Such networks support the passing of messages between different computer systems, connecting multiple applications and multiple operating systems. Messages can also be passed from queue to queue in order for a message to reach the ultimate desired recipient. An example of a commercial implementation of such messaging software is IBM's WebSphere MQ (previously MQ Series).

In a synchronous communication protocol, one system connects to another system, sends a request and waits for a reply. In many situations this is the ideal method of communicating. For example, a user sends a request for a web page and then waits for a reply. However, other systems exist in which such behaviour is not desirable. For example, an application may need to notify a different application that an event has occurred, but does not need to wait for a response. Another example occurs in publish/subscribe systems, where an application publishes a message for any number of clients to read. In both these examples it would not make sense for the sender of the information to have to wait for a reply, if, for example, one of the recipients had crashed.

Alternatively, an application run by a website, such as an online store, may need to respond to certain parts of a request immediately (such as telling the user that a purchase has been accepted), but may queue other parts (such as the calculation of invoice amounts and the forwarding of data to the central accounting system, and so on) to be done some time later. In all these sorts of situations, having at least a subsystem which does asynchronous message queuing can help improve the performance of the overall system.

One way messages may be sent reliably and, using a transactional queuing system, may be sent as part of the requesting application's transaction. On the receiving side, a message may be received and executed as part of a separate transaction. Existing messaging systems support assured message "delivery" for asynchronous and time-independent one way communication between an application source and an application destination. Such a facility accommodates the possibilities of link failure and many other conditions that can arise in complex networks.

The receiver need not be available when a message is transmitted by the source and the communication path the message traverses may be across different execution environments (therefore traditional distributed atomic transactions are not appropriate for messaging). A typical model is that there are three participants, the message source, the messaging service and message receiver, each in a different transaction, with the messaging service middleware taking responsibility for delivering the messages reliably between transactions.

Each participant may be doing other work, for example, performing database I/O, dealing with other messages or even taking part in a distributed synchronous transaction with other servers. Typically the message source places a message on a queue, and it is sent when the transaction is committed (i.e. the source hands the message to the transactional messaging service and when the message source commits the transaction the messaging service "persists" the message to be delivered to the receiving target so that it can be reliably delivered across any failure of the transport). The messaging service provider logically has a transaction that includes receiving the message from a persistent queue and placing the message on a queue designated for the message receiver. Finally, the message receiver (which may or may not be the message source) performs a transaction that includes retrieving the message from a queue and processing the contents of the message (which might involve executing a business service). Such a method of operation is known as an 'unshared-transaction' between message source and message receiver.

SUMMARY

According to a first embodiment of the invention, there is provided a method of handling a message in a messaging system, the messaging system comprising a message source, a message receiver and a message service intermediate of the message source and message receiver, wherein a compensation component is established at the message source, the method comprising the steps of: transmitting a one way message, as part of a business transaction, from the message source, the transaction comprising a plurality of one way messages, receiving the message at the message service, transmitting the message from the messaging service, receiving the message at the message receiver, processing the message at the message receiver, transmitting a communication from the message receiver, the communication indicating success or failure of the processing of the message, receiving the communication at the messaging service, and responsive to receiving an indication of a failure of part of the transaction when the communication indicated that processing of the one way message succeeded, causing compensation logic defined by the compensation component to execute.

According to another aspect of an embodiment of the invention, there is provided a messaging system comprising a message source, a message receiver and a message service intermediate of the message source and message receiver, wherein a compensation component is established at the message source, wherein: the message source is arranged to transmit a one way message, wherein the one way message is part of a business transaction, the business transaction comprising a plurality of one way messages, the message service is arranged to receive the message and to transmit the message, the message receiver is arranged to receive the message, to process the message, and to transmit a communication, the communication indicating success or failure of the processing of the message, and the messaging service is arranged to receive the communication, the message service being, responsive to receiving an indication of a failure of part of the transaction when the communication indicated that processing of the one way message succeeded, operable to cause compensation logic defined by the compensation component to execute.

According to a another aspect of an embodiment of the invention, there is provided a method of operating a message source comprising: initiating an action, transmitting a one way message from the message source, in response to the action, the one way message being part of a business transaction comprising a plurality of one way messages and establishing a compensation component at the message source, the compensation component defining actions to be taken, if the processing of the message succeeds, whilst the processing of a part of the transaction fails.

According to another aspect of an embodiment of the invention, there is provided a message source arranged to initiate an action, to transmit a one way message from the message source, in response to the action, the one way message being part of a business transaction comprising a plurality of one way messages, the message source being further arranged to establish a compensation component at the message source, the compensation component defining actions to be taken, if the processing of the message succeeds, whilst the processing of a part of the transaction fails.

According to another aspect of an embodiment of the invention, there is provided a computer program product on a computer readable medium for operating a message source, the product comprising instructions for: initiating an action, transmitting a one way message from the message source, in response to the action, the one way message being part of a business transaction comprising a plurality of one way messages, and establishing a compensation component at the message source, the compensation component defining actions to be taken, if the processing of the message succeeds whilst the processing of a part of the transaction fails.

According to a sixth aspect, there is provided a method of operating a message service in a messaging system, the messaging system comprising a message source, a message receiver and the message service intermediate of the message source and message receiver, the method comprising the steps of: receiving a one way message, as part of a business transaction, from the message source, the transaction comprising a plurality of one way messages, transmitting the message from the messaging service to the message receiver for processing thereat, receiving a communication from the message receiver, the communication indicating success or failure of the processing of the message, and responsive to receiving an indication of a failure of part of the transaction when the communication indicated that processing of the one way message succeeded, causing compensation logic defined by a compensation component established at the message source to execute.

According to an other aspect of an embodiment of the invention, there is provided a message service, operable in a messaging system, the messaging system comprising a message source, a message receiver and the message service intermediate of the message source and message receiver, the apparatus comprising: means for receiving a one way message, as part of a business transaction, from the message source, the transaction comprising a plurality of one way messages, means for transmitting the message from the messaging service to the message receiver for processing thereat, means for receiving a communication from the message receiver, the communication indicating success or failure of the processing of the message, and means, responsive to receiving an indication of a failure of part of the transaction when the communication indicated that processing of the one way message succeeded, for causing compensation logic defined by a compensation component established at the message source to execute.

The method and system ensure that even if the original message source is disconnected from the message service, following the sending of the message, as will happen in an asynchronous system, there is a mechanism for dealing with the failure of a part of the overall business transaction, when the processing of the message (which was also part of that transaction) actually succeeded. This is provided by the existence of the compensation component (established within the source), which is executed if needed, and can for example, trigger a subsequent message specifying a compensation action be preformed by the message receiver. The originating application at the message source preferably does not need to wait around in order to drive the compensation since the application delegates to the messaging service after the source fires and forgets the original message. The messaging source preferably pre-registers the compensation component with the messaging system.

In one embodiment, the method further comprises receiving a compensation message at the message receiver and processing the compensation message at the message receiver. The compensation component, once executed, can generate a compensation message, which can be sent to the original message receiver (or a different message receiver), in order for that message consumer to process the compensation message and carry out the necessary actions required to correct the situation that has arisen following the failure of the processing of the business transaction. This means that any changes that need to be made, in relation to the service delivered by the message receiver, can be carried out in the most efficient manner.

In one embodiment, the messaging service comprises a transaction management unit and the method further comprises receiving the compensation component at the transaction management unit. The use of transaction management functionality within the messaging system supports effective implementation of a number of desired features such as the monitoring of the delivery and execution of messages.

Ideally, the messaging service comprises one or more queues and the step of receiving the message at the message service comprises receiving the message at a queue. Where the messaging service comprises a plurality of queues the method further comprises receiving and transmitting the message by two or more queues in turn. In a preferred embodiment, there is performed a transaction confirmation for each queue of the two or more queues in turn. Each movement of the message through the message service creates a transaction, which can be considered as creating each time a child transaction to the previous transaction, effectively creating a nested series of transactions. This enables the transaction unit to be in a position that it is made aware that each hop of the message through the message service to be completed, and that the ultimate processing of the message has also been completed. Each transaction is committed if successful or returns a fail communication if not.

DESCRIPTION OF THE DRAWINGS

Embodiments of the present invention will now be described, by way of example only, with reference to the accompanying drawings, in which:—

DESCRIPTION

Figure 1:
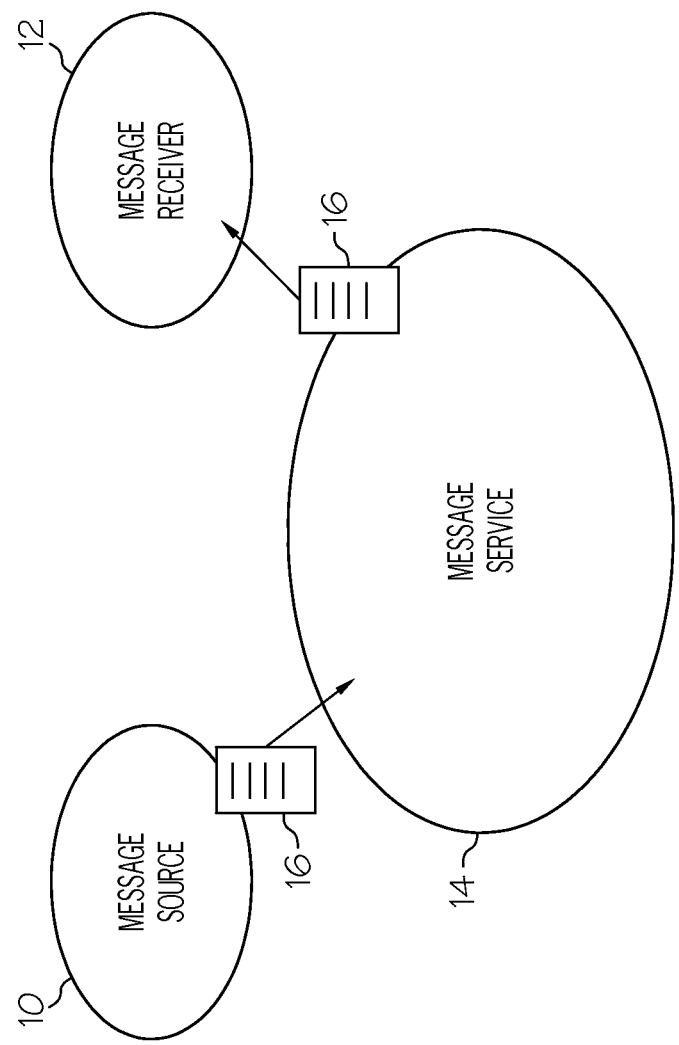
FIG. 1 is a schematic diagram of a messaging computer system according to an embodiment of the invention.

FIG. 1 shows a messaging computer system, in a schematic representation. The messaging system comprises a message source 10, a message receiver 12 and a message service 14, which is intermediate of the message source 10 and the message receiver 12. A single message 16 is shown, firstly as the message 16 is transmitted from the message source 10 to the message service 14, and secondly as the message 16 is transmitted from the message service 14 to the message receiver 12. The system shown in FIG. 1 could be, for example, the back-end system of a retail website where users purchase goods. The message source 10 could be a server hosting the website, and when an action is initiated, such as a user making a purchase, then various messages 16 will be generated, for example, to update the user's account, to update stock records, to claim money from a third party account, and so on. The message receiver 12 could be a server that is maintaining the stock records, for example.

The system of FIG. 1 is modified to provide an improvement over known systems. Using transactions which support a long duration, loosely coupled interaction between sender and receiver, there is provided autonomic recovery and guaranteed execution capabilities, which are transparent to the existing messaging system. An implementation may consist either of an adapter that augments the existing messaging services implementation or modification of the existing messaging services to provide a shared transaction between the message source 10 and the message receiver 12.

The system may use nested transaction relationships in which the individual unshared transactions (each representing one leg of the overall message communication) are themselves child participants in a single distributed, shared parent transaction, as an example, "business activity" in WS-BA (web services business activity) parlance. Each successfully completed nested child transaction may have an associated compensating action that is driven in the event of an unsuccessful outcome of the overall business transaction. Context from each parent transaction is propagated to its immediate children. Additionally, compensation logic is provided to automate any necessary recovery required by the communication for the overall transaction between message source and message receiver. This is may be provided to the intermediate messaging service but equally may exist elsewhere and be triggered by the message service. The system also employs transaction protocol messages, specifically a completion message, to determine that any messages have not only been delivered but have also been successfully executed by the message receiver.

Using transactions that support a long-duration, loosely coupled interaction between the sender 10 and the receiver 12 provides a means to involve the outcome of the asynchronously, reliably-invoked target service in the requester's unit of work (as embodied by the message 16) and to provide autonomic recovery and guaranteed execution capabilities transparent to the existing messaging system. As mentioned above, an implementation may consist either of an adapter that augments the existing messaging service's implementation or a modification of the existing messaging services to provide a 'shared-transaction' between the message source 10 and the message receiver 12 within which the unshared transactions are subordinate participants.

Figure 2:
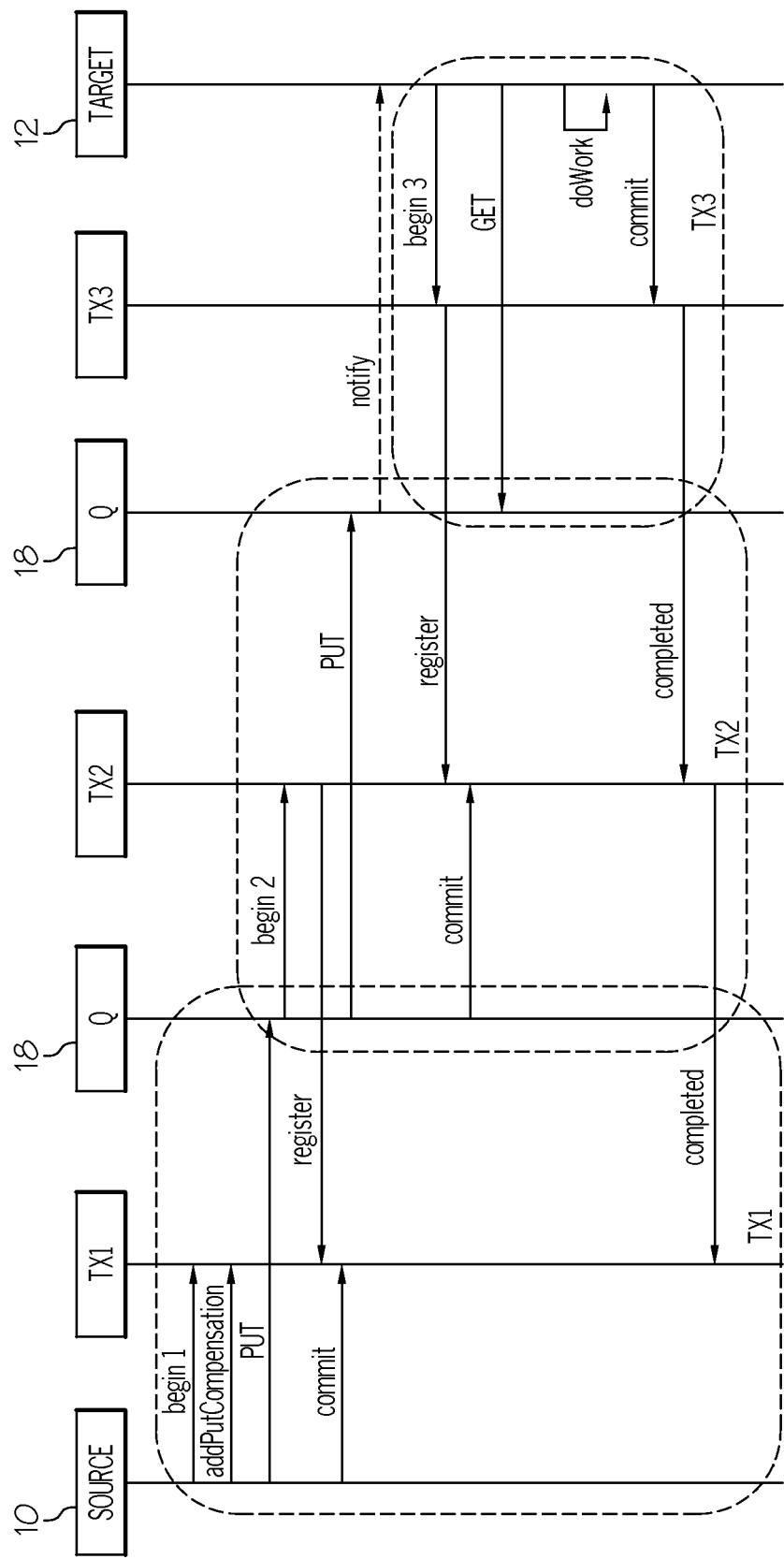
FIGS. 2 to 5 are process flow diagrams of message flow in the messaging system according to an embodiment of the invention.

The sequence diagram of FIG. 2 illustrates an example of the end-to-end-flows using a nested sequence. For simplicity, the sequence illustrates a single PUT from the messaging client 10, but a sequence of messages to a single receiver 12 or a series of messages to different receivers 12 are modelled in the same way. The message source 10 is shown on the left-hand side of the diagram, and the message receiver 12 is shown on the right-hand side, with the messaging service 14 in-between. The message service 14 is represented by a pair of queues 18.

TX1 represents the overall transaction under which the client 10 initiates all its work. TX1 is initiated on the client's behalf but is longer-running than the client application itself; TX1 has a child-participant transaction and is not actually committed until it receives the "completed" acknowledgement from its child, typically long after the client 10 has finished processing. A compensation component, which has been established by the messaging source 10, "PUT compensation handler", is added to the TX1 activity if the PUT to the first queue 18 is successful. Later, if the overall TX1 activity fails, the "PUT compensation" is executed, and puts another (compensation) message on the queue 18 to instruct the target 12 to compensate anything it did on forward processing.

The messaging infrastructure, represented by a transaction management unit, creates a transaction, TX2, as a child-participant of TX1, and the message is delivered to the target queue 18 as part of TX2. TX2 itself has a child-participant transaction and so is not actually committed until it receives the "completed" acknowledgement from its own child-participant. No explicit compensation handler needs to be added for TX2, although TX2 is itself implicitly registered as a child-participant of TX1. The messaging infrastructure creates a transaction TX3, as a child-participant of TX2. Under this transaction the message is read from the destination queue 18 by the target application 12 and any business logic is executed. No explicit compensation handler needs to be added for TX3, although TX3 is itself implicitly registered as a child-participant of TX2.

If the work of the target 12 fails for reasons of transient resource unavailability then the message will be redelivered by the messaging system. When TX3 commits it send a "completed" message to its parent TX2; this in turn triggers TX2 to send a "completed" message to its parent TX1. Once TX1 has successfully completed all its processing it sends its compensation handlers and child-participants a "close" message (not shown in the sequence diagram) to clean up. These in turn delegate this message onto any of their own child-participants.

If the overall transaction TX1 fails, for example because another message sequence, not shown, failed while running in parallel to this one, then any compensation handlers and child-participants are driven to compensate. In this scenario, the child-participants do not need to perform any explicit compensation handling; the only compensation handler that needs to do anything is the "PUT compensation handler" which puts a new message to the transmission queue 18 to ultimately drive a processing in the target 12 that will need to compensate for what it did under TX3.

Figure 3:
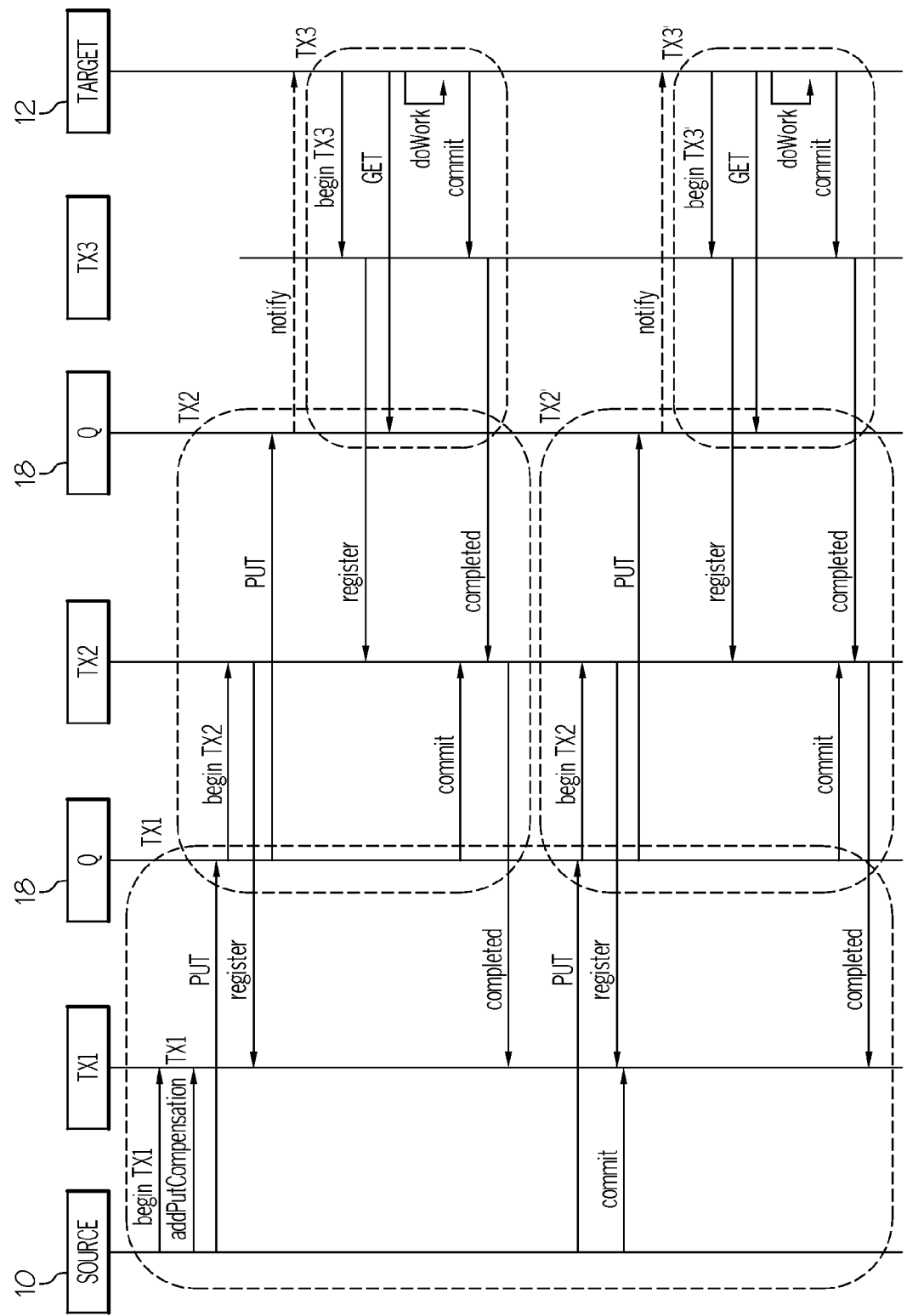

FIG. 3 illustrates the similar situation to that shown in the sequence diagram of FIG. 2, but this time with the creation of two messages by the message source 10, from the application that is being run by that source 10. Any user action in relation to the application run by the message source 10 can create multiple messages, which need to be passed to and processed on the target message receiver 12. These two messages are put onto a first queue 18 in the messaging service, which creates the first transaction TX1. The messaging source 10 will establish a corresponding compensation component for the messages.

The transaction management unit, of the messaging service, will then create two parallel child transactions TX2 and TX2', one for each of the original messages. This results in the passing of the respective messages to a second queue 18. The notification and getting of the messages from the second queue 18 to the ultimate target message receiver 12 in turn creates two further parallel child transactions TX3 and TX3'.

Although these are shown as dealing with the same target 12, they may have different message receivers 12 as the target consumer of the messages.

At the start of the process, the message source 10 also establishes the compensation component, and this component covers the necessary actions required if either of the messages fail to be processed by the target 12, whatever the reason for that failure. In the example of FIG. 3, both of the transactions TX3 and TX3' are performed successfully, and the units of work are committed as transactions, and each child transaction will result in the parent transaction being completed back to the original transaction TX1. This ensures that the transaction created as a result of the original receipt of the messages from the message source 10 is completed, and the asynchronous work generated by the messages is known to the messaging service to have been completed. The compensation component could be provided to the messaging service or may exist elsewhere and be triggered by the messaging service as necessary.

Figure 4:
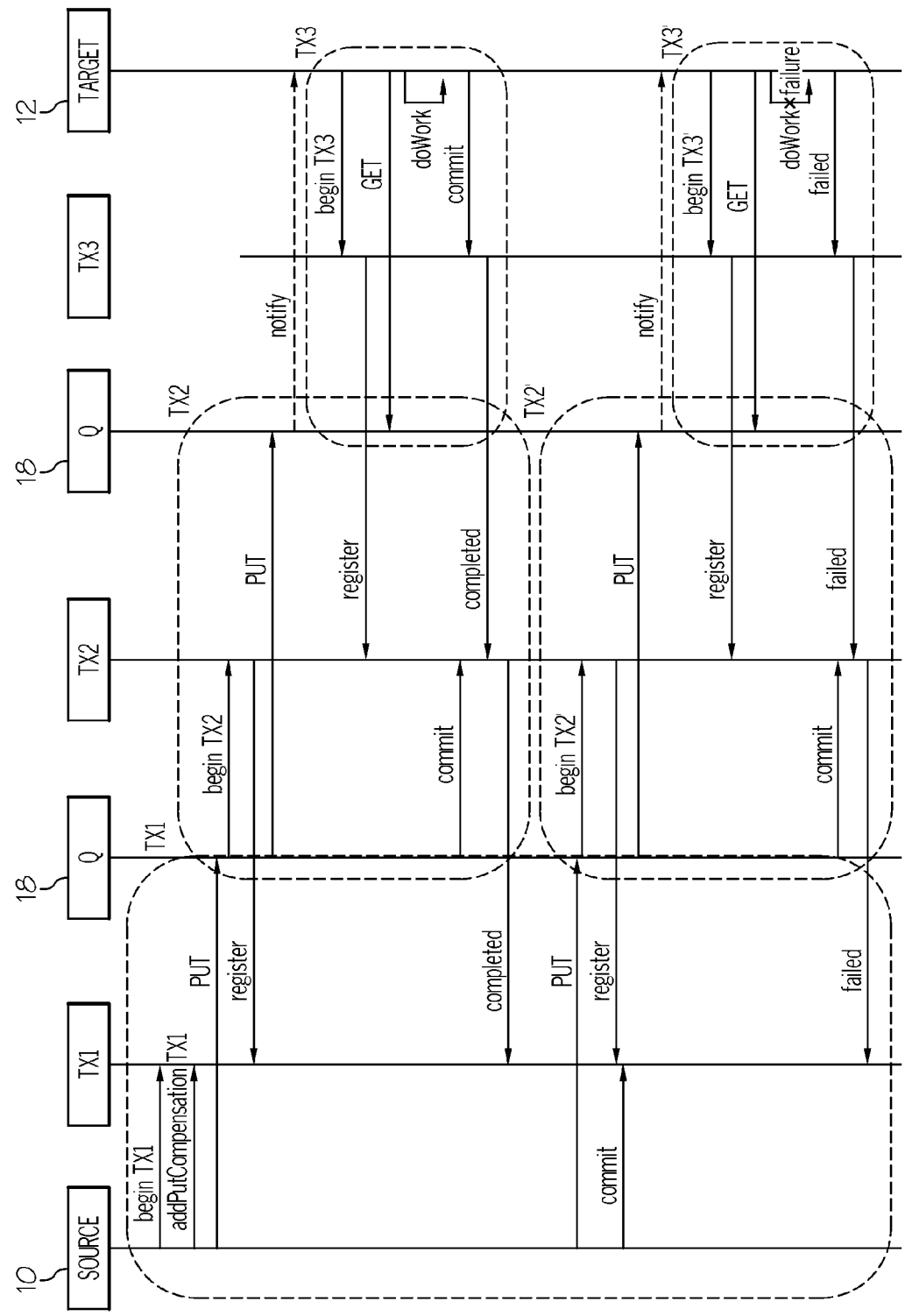

FIG. 4, however, shows the traffic that occurs when a failure takes place. The failure in this sequence diagram occurs in relation to the transaction TX3'. In this example, the target 12 was unable to execute the piece of work embodied by the second message, of the two messages originally provided by the message source 10 to the messaging service. The reason for the failure is not material to the operation of the overall messaging system. In the example of FIG. 1, the target message receiver 12 was a server running a stock record. The failure of the processing of the message associated with the transaction TX3' could be, for example, that since the user made the order, the item that the user wishes to purchase is now no longer in stock.

As a result of the failure of the target message receiver 12 to process the message, the TX3' transaction will return a fail communication. This fail communication, shown as the arrow marked "failed" in the sequence diagram of FIG. 4, will be passed to the parent transaction TX2'. This causes the parent transaction TX2 to fail. In a similar fashion, the parent transaction TX2' will also return a fail communication, again shown as the arrow "failed", and transaction TX1 will also fail. The total result of this fail communication trail is that the transaction management unit in the message service may register a fail condition for the entire transaction, indicating therefore that the work embodied by the specific message has not been carried out.

Upon receiving the fail communication at the messaging service, and because the communication indicates a failure of the processing of the work embodied by the second message, the messaging service is arranged to execute the compensation component, for example by transmitting a new message to the target message receiver 12. The compensation logic that was supplied with the original messages, shown as the arrow "AddPutCompensation" in the sequence diagram, provides the recovery function in the asynchronous process of handling the message.

Figure 5:
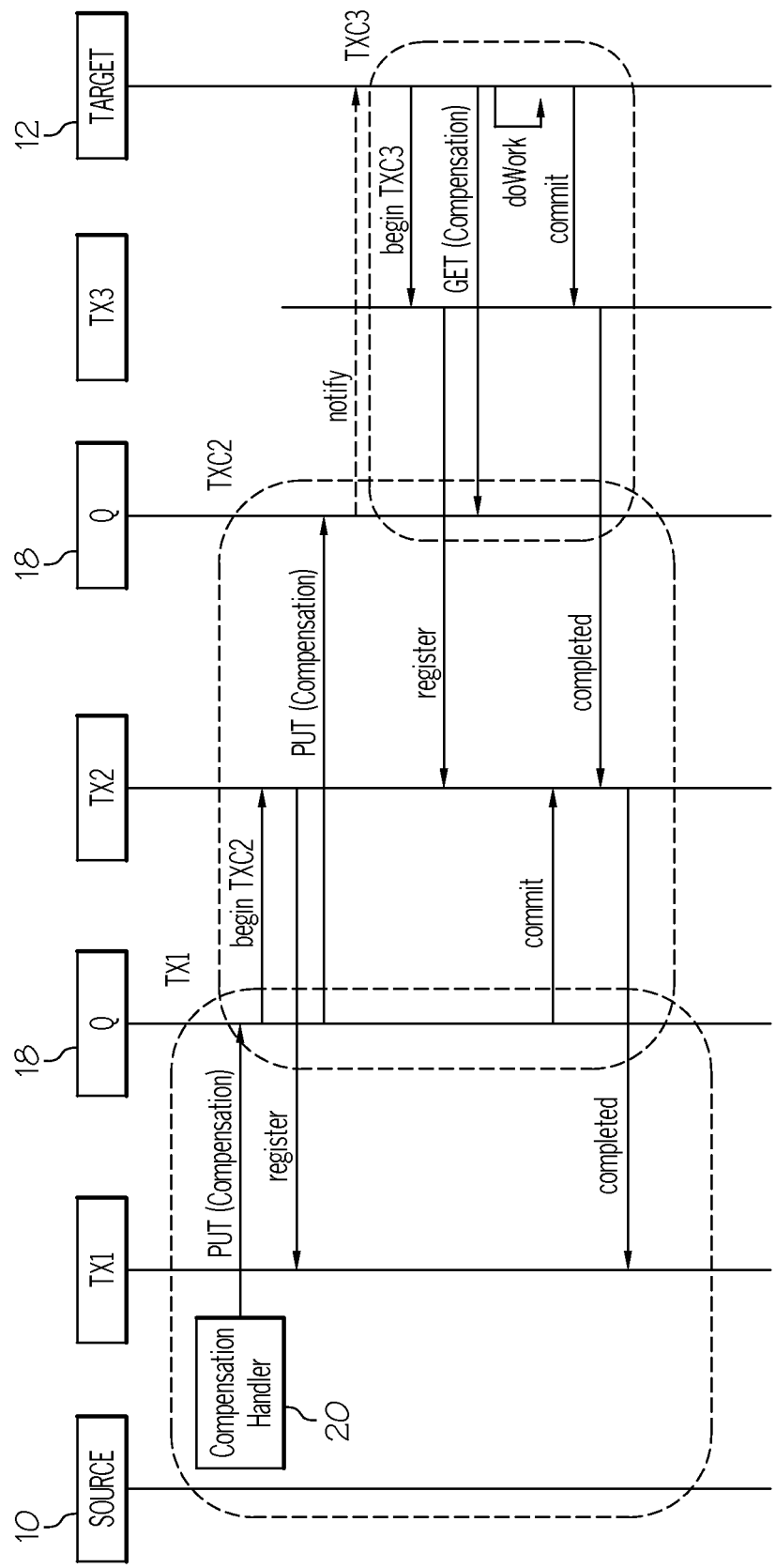

The processing that occurs in the system following the failure communication reaching the transaction management unit is illustrated by the sequence diagram of FIG. 5. This diagram is augmented by a compensation handler 20, which is part of the message service, and may be located, for example, within the functionality of the transaction management unit. The compensation handler 20 is responsible for initiating the actions that will "repair" any damage caused by the failure of the processing of one or more of the original message(s) when the processing of work related to one message sent in the same transaction has succeeded. The compensation handler 20 can be added to an existing messaging system, in order to embody the functionality that is required in the improved asynchronous messaging system.

The nature of the compensation will be specific to the character of the work that was embodied by the message that failed. For example, the execution of the compensation component may specify reversal of certain actions taken, or may specify new actions. For example, the original message might be to order an item from a merchant and a second message might be an instruction to draw money from a customer's third party account. If the operation triggered by the second message fails through lack of funds in the customer's account, then compensation logic defined by the compensation component, sent by the compensation handler 20, may denote an excess charge to the user's account and a cancellation of the original order. The operation of the messaging service is not such that it is determining what compensation should take place, the originating message source 10 specifies the compensation component.

If the compensation handler 20 has executed the compensation component and been instructed to transmit a compensation message to the message receiver 12, then the compensation handler 20 will place the relevant compensation message onto a queue 18 within the messaging service. This compensation message will then flow through the messaging service like any other message, until it reaches the target message receiver 12. Child transactions will be created as the compensation message passes through individual queues 18 within the messaging service, as can be seen by the child transactions TXC2 and TXC3 within the sequence diagram. The message receiver 12 receives the compensation message and processing of the compensation message takes place at the message receiver 12. This transaction is committed once completed, and completion messages flow back through the message service, through the child transactions, to confirm that the compensation has been carried out successfully.

Figure 6:
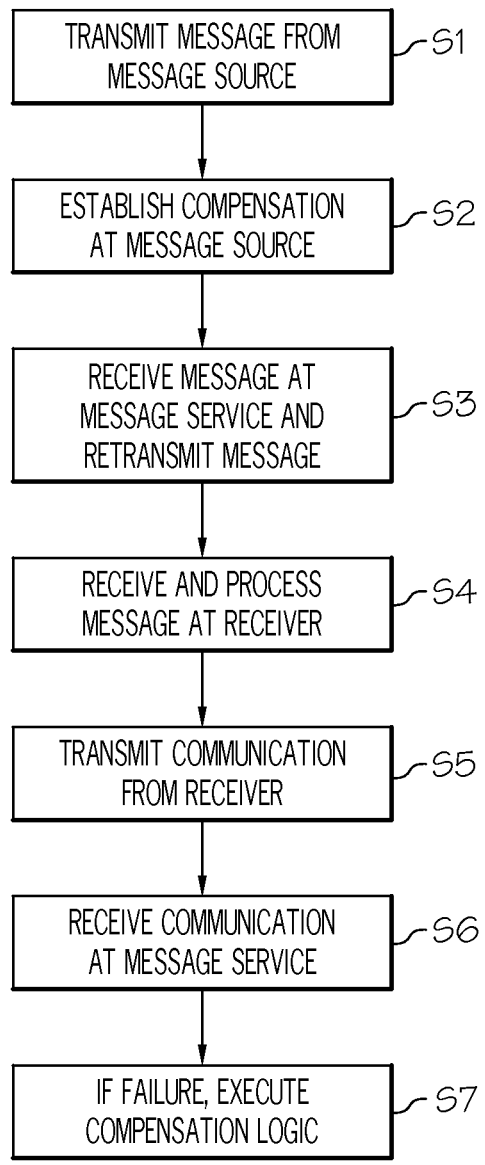
FIG. 6 is a flowchart of a method of operating the messaging system according to an embodiment of the invention.

The method of operating the overall messaging system is summarised in FIG. 6. This Figure shows a flowchart of the processing that occurs after the generation of the message 16, at an application that is being run by the message source 10. After an action is initiated at the message source 10, then the first step of the method is the step S1 of transmitting the message 16 from the message source 10 to the message service 14. The message is part of a business transaction comprising a plurality of messages. At the same time, step S2 is performed, which comprises establishing the compensation component at the message source 10. The compensation logic may also be transmitted to the message service or may be registered elsewhere.

The third step, step S3, is the step of receiving the message 16 at the message service 14, and transmitting the message 16 from the messaging service 14. As discussed above, the receipt and transmittal of the message 16 by the messaging service 14 may include passing the message 16 through intermediate nodes of the messaging service 14, where such nodes may be queues 18, for example.

The next step S4 is the step of receiving the message 16 at the message receiver 12, and processing the message 16 at the message receiver 12. The receipt by the message receiver 12 of the message 16 may be achieved by the messaging service 14 informing the receiver 12 that a message 16 is available on a specific queue 18, and the message receiver 12 will get the message 16 from that queue 18 when the receiver 12 is ready to perform the processing of the specific message 16.

Once the processing of the message 16 has been successfully completed, or has failed, then the next step is the step S5 of transmitting a communication from the message receiver 12, the communication indicating success or failure of the processing of the message 16. This communication is used so that the transaction protocols being used in the system will have a guarantee of execution of the original message 16, not just of the delivery of the message 16. In the explanation of the messaging system, for clarity purposes, the term "message" has been used to mean the unit of work passed to the message receiver 12, and "communication" has been used to mean the confirmation passed back from the message receiver 12. However, in the context of a messaging system the "message" and "communication" will both be of the same format and will be handled in the same way. Different terms have been used to clearly indicate which is meant in the explanation.

The next step is the step S6 of receiving the communication at the messaging service 14. An indication of success or failure is then provided to the message source. An indication may also be received to indicate failure of the overall business transaction. If the overall business transaction failed when processing of the original message succeeded, then, the final step S7 of executing the compensation component is carried. This execution may comprise the generation of a new compensation message(s), depending upon the nature of the failure, for transmitting to the message receiver 12. The message receiver 12 will receive the compensation message and process that message. In this way, the messaging service 14 is aware that either the processing was successful (not just that the message 16 was delivered) or that the processing failed. If the processing failed, then there is an automatic handling of the compensation necessary to balance the error, without the need of any administrator intervention, nor needing to return to the originator of the message 16, the message source 10, which in an asynchronous system, will likely no longer be available.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be appreciated that the embodiments of the invention as described will ensure that even if the original message source is disconnected from the message service, following the sending of the message, as will happen in an asynchronous system, there is a mechanism for dealing with the failure of a part of the overall business transaction, when the processing of the message (which was also part of that transaction) actually succeeded. This is provided by the existence of the compensation component (established within the source), which is executed if needed, and can for example, trigger a subsequent message specifying a compensation action be preformed by the message receiver. The originating application at the message source preferably does not need to wait around in order to drive the compensation since the application delegates to the messaging service after the source fires and forgets the original message. The messaging source preferably pre-registers the compensation component with the messaging system.

Furthermore, it is understood that the messaging service comprises one or more queues and the step of receiving the message at the message service comprises receiving the message at a queue. Where the messaging service comprises a plurality of queues the method further comprises receiving and transmitting the message by two or more queues in turn. In a preferred embodiment, there is performed a transaction confirmation for each queue of the two or more queues in turn. Each movement of the message through the message service creates a transaction, which can be considered as creating each time a child transaction to the previous transaction, effectively creating a nested series of transactions. This enables the transaction unit to be in a position that it is made aware that each hop of the message through the message service to be completed, and that the ultimate processing of the message has also been completed. Each transaction is committed if successful or returns a fail communication if not.

Also, as described the method further comprises receiving a compensation message at the message receiver and processing the compensation message at the message receiver. The compensation component, once executed, can generate a compensation message, which can be sent to the original message receiver (or a different message receiver), in order for that message consumer to process the compensation message and carry out the necessary actions required to correct the situation that has arisen following the failure of the processing of the business transaction. This means that any changes that need to be made, in relation to the service delivered by the message receiver, can be carried out in the most efficient manner.

The invention claimed is:

1. A method of handling a message in a messaging system, the messaging system comprising a message source, a message receiver and a message service having a plurality of queues, wherein the message service is intermediate of the message source and message receiver, wherein a compensation component is established at the message source, the method comprising the steps of:
    transmitting a one way message, as part of a business transaction, from the message source, the transaction comprising a plurality of one way messages,
    receiving the message into and transmitting the message from, at least two of the plurality of queues of the message service in turn, using a processor, by:
        receiving the message at a first one of the plurality of queues of the message service,
        transmitting the message from the first one of the plurality of queues to a second one of the plurality of queues, and
        transmitting the message from the second one of the plurality of queues of the messaging service,
    receiving the message at the message receiver,
    processing the message at the message receiver,
    transmitting a communication from the message receiver, the communication indicating success or failure of the processing of the message,
    receiving the communication at the messaging service,
    performing, with a processor, a transaction confirmation for each queue of the first one and second one of the plurality of queues, in turn, and
responsive to receiving an indication of a failure of part of the transaction when the communication indicated that processing of the one way message succeeded, causing compensation logic defined by the compensation component to execute.

2. The method according to claim 1, wherein executing the compensation component comprises generating a compensation message, and the method further comprises receiving the compensation message at a message receiver and processing the compensation message at the message receiver.

3. The method according to claim 1, further comprising implementing the messaging service as a transaction management unit, the method further comprising receiving the compensation component at the transaction management unit.

4. A messaging system comprising a message source, a message receiver and a message service intermediate of the message source and message receiver, wherein a compensation component is established at the message source, further comprising a microprocessor coupled to memory, wherein the microprocessor is programmed to implement the message service, the message service having a plurality of queues, wherein:
    the message source is arranged to transmit a one way message, wherein the one way message is part of a business transaction, the business transaction comprising a plurality of one way messages,
    the message service is arranged to receive the message and to transmit the message through at least two of the plurality of queues in turn,
    the message receiver is arranged to receive the message, to process the message, and to transmit a communication, the communication indicating success or failure of the processing of the message,
    the messaging service is arranged to perform a transaction confirmation for each queue of the plurality of queues that received and transmitted the message, in turn, and
    the messaging service is arranged to receive the communication, the message service being, responsive to receiving an indication of a failure of part of the transaction when the communication indicated that processing of the one way message succeeded, operable to cause compensation logic defined by the compensation component to execute.

5. The system according to claim 4, wherein the message service is arranged, when executing the compensation component, to generate a compensation message and to transmit the compensation message, and a message receiver is arranged to receive the compensation message and to process the compensation message.

6. The system according to claim 4, wherein the messaging service comprises a transaction management unit and the transaction management unit is arranged to receive the compensation component.

7. A method of operating a message service in a messaging system, the message service having a plurality of queues, where the messaging system comprises a message source, a message receiver and the message service intermediate of the message source and message receiver, the method comprising:
    receiving a one way message, as part of a business transaction, from the message source, the transaction comprising a plurality of one way messages,
    receiving the message into and transmitting the message from, at least two of the plurality of queues of the message service in turn, using a processor, by:
        receiving the message at a first one of the plurality of queues of the message service,
        transmitting the message from the first one of the plurality of queues to a second one of the plurality of queues, and
        transmitting the message from the second one of the plurality of queues of the messaging service,
    transmitting the message from the messaging service to the message receiver for processing thereat,
    receiving a communication from the message receiver, the communication indicating success or failure of the processing of the message,
    performing, with a processor, a transaction confirmation for each queue of the first one and second one of the plurality of queues, in turn, and
    responsive to receiving an indication of a failure of part of the transaction when the communication indicated that processing of the one way message succeeded, causing compensation logic defined by a compensation component established at the message source to execute.

8. A message service having a plurality of queues, where the message service is intermediate of a message source and a message receiver in a messaging system, the message service comprising:
    a microprocessor coupled to a memory, wherein the microprocessor is programmed to implement the message service by:
    receiving a one way message, as part of a business transaction, from the message source, the transaction comprising a plurality of one way messages, wherein receiving a message comprises receiving the message into and transmitting the message from, at least two of the plurality of queues of the message service in turn, by:
        receiving the message at a first one of the plurality of queues of the message service, transmitting the message from the first one of the plurality of queues to a second one of the plurality of queues, and transmitting the message from the second one of the plurality of queues of the messaging service, transmitting the message from the messaging service to the message receiver for processing thereat, receiving a communication from the message receiver, the communication indicating success or failure of the processing of the message, performing a transaction confirmation for each queue of the first one and second one of the plurality of queues, in turn, and causing compensation logic defined by a compensation component established at the message source to execute, responsive to receiving an indication of a failure of part of the transaction when the communication indicated that processing of the one way message succeeded.

* * * * *